United States Patent
Pfeifer et al.

(10) Patent No.: US 6,904,840 B1
(45) Date of Patent: Jun. 14, 2005

(54) BREWER APPARATUS WITH IMPROVED TRAY ASSEMBLY

(75) Inventors: Thomas J. Pfeifer, Louisville, KY (US); Michael J. Edrington, Louisville, KY (US)

(73) Assignee: Grindmaster Corporation, Louisville, KY (US)

( * ) Notice: Subject to any disclaimer, the term of this patent is extended or adjusted under 35 U.S.C. 154(b) by 4 days.

(21) Appl. No.: 10/909,631

(22) Filed: Aug. 2, 2004

Related U.S. Application Data (60) Provisional application No. 60/540,242, filed on Jan. 28, 2004.

(51) Int. Cl.[7] ............................. A47J 31/06; A47J 31/40
(52) U.S. Cl. ...................................... 99/295; 99/289 R
(58) Field of Search .................... 99/495, 452, 285, 99/289 R, 295, 297, 299, 304–306, 316, 319, 279, 385, 318, 323, 323.1, 323.3, 300, 302 R, 307, 302 P, 289 T; 426/433–435, 77–82

(56) References Cited

U.S. PATENT DOCUMENTS

| | | | |
|---|---|---|---|
| 2,589,783 A | | 3/1952 | Crossley et al. |
| 4,328,740 A | * | 5/1982 | McDonough et al. .......... 99/295 |
| 4,402,257 A | * | 9/1983 | Marotta ....................... 99/307 |
| 4,532,142 A | * | 7/1985 | Dean ........................... 426/388 |
| 4,540,146 A | | 9/1985 | Basile |
| 4,843,955 A | * | 7/1989 | Henn et al. .................... 99/295 |
| 5,197,374 A | * | 3/1993 | Fond ............................ 99/295 |
| 5,503,060 A | * | 4/1996 | Morecroft et al. ............. 99/295 |
| 5,505,120 A | * | 4/1996 | Albertson ..................... 99/286 |
| 5,526,733 A | | 6/1996 | Klawuhn et al. |
| 5,638,741 A | | 6/1997 | Cisaria |
| 5,642,656 A | * | 7/1997 | Braendle ...................... 99/295 |
| 5,676,041 A | * | 10/1997 | Glucksman et al. .......... 99/286 |
| 5,794,519 A | | 8/1998 | Fischer |
| 5,862,739 A | * | 1/1999 | Lin ............................. 99/285 |
| 5,896,806 A | | 4/1999 | Dal Tio |
| 6,009,792 A | | 1/2000 | Kraan |
| 6,047,630 A | | 4/2000 | Brown et al. |
| 6,192,786 B1 | | 2/2001 | Gasser et al. |
| 6,227,101 B1 | | 5/2001 | Rabadi et al. |
| 6,382,083 B2 | * | 5/2002 | Schmed ..................... 99/289 R |
| 6,752,070 B1 | * | 6/2004 | Lin ............................. 99/295 |
| 2003/0066431 A1 | | 4/2003 | Fanzutti et al. |

FOREIGN PATENT DOCUMENTS

| | | |
|---|---|---|
| CA | 2121998 | 10/1995 |
| JP | 5-293048 | 11/1993 |
| WO | WO 03/03696 A1 | 4/2003 |
| WO | WO 2004/006741 A2 | 1/2004 |

\* cited by examiner

*Primary Examiner*—Timothy F. Simone
(74) *Attorney, Agent, or Firm*—Stites & Harbison, PLLC; David W. Nagle, Jr.

(57) ABSTRACT

A brewer apparatus includes a tray assembly for positioning and securing a pod enclosing a beverage component below the brew head of the apparatus. The tray assembly is generally constructed so as to allow selective movement of the tray assembly between a first position where it is positioned below the brew head, and a second position where it extends away from the housing of the brewer apparatus, thus allowing access to the quantity of beverage component. Furthermore, the brewer apparatus can be pivoted between a closed position where it is sealed against the tray assembly for brewing and an open position where it is pivoted upwardly and away from said tray assembly to allow for the selective movement of said tray assembly from said first position to said second position.

18 Claims, 10 Drawing Sheets

BREWER APPARATUS WITH IMPROVED TRAY ASSEMBLY

CROSS-REFERENCE TO RELATED APPLICATIONS

The present application claims priority to U.S. Provisional Application Ser. No. 60/540,242 filed Jan. 28, 2004, the entire disclosure of which is incorporated herein by reference.

BACKGROUND OF THE INVENTION

The present invention relates to coffee brewers and similar brewer apparatus, and, more particularly, to the construction of a tray assembly for a brewer apparatus that positions and secures a pod enclosing a beverage component below the brew head for brewing.

In brewing coffee or similar beverages, each consumer has their own taste preferences. In response, as an alternative to traditional multi-cup brewers, there have been efforts to develop brewers that use a single-serve pod. Thus, an individual consumer can brew a single serving of coffee or another beverage, and furthermore, has some flexibility in determining the relative strength of the brewed beverage. When using such a pod, however, the proper positioning of the pod relative to the brew head is important in ensuring the dispensing of a high quality beverage.

It would therefore be desirable to provide a brewer apparatus with an improved tray assembly that ensures proper positioning of the pod relative to the brew head, while also facilitating loading and unloading of the pod from the tray assembly.

SUMMARY OF THE INVENTION

The present invention is a brewer apparatus with an improved tray assembly for positioning and securing a pod enclosing a beverage component below the brew head for brewing. The tray assembly generally is constructed so as to allow selective movement of the tray assembly between a first position where it is positioned below the brew head, and a second position where it extends away from the housing of the brewer apparatus, thus allowing access to the pod enclosing the quantity of beverage component.

Furthermore, the brew head of the brewer apparatus can be pivoted between a closed position where it is sealed against the tray assembly for brewing and an open position where it is pivoted upwardly and away from said tray assembly to allow for the selective movement of said tray assembly from said first position to said second position.

As such, to unload and/or load the tray assembly with a pod, a user first must disengage the tray assembly from its position relative to the brew head. This disengagement is preferably effectuated by lifting a release latch that extends outwardly from the tray assembly, and the brew head can then be pivoted upwardly and away from the tray assembly to its open position. The tray assembly can then be pulled and moved away from the housing and remainder of the brewer apparatus, allowing access to the pod enclosing the beverage component. Once a new pod has been received in the tray assembly, the tray assembly can pushed and advanced back into position relative to the brew head, and, by pushing down on a button extending from the brew head, the brew head is pivoted into a closed position where it is sealed against the tray assembly, and the tray assembly is effectively locked into position relative to the brew head. Once the pod has been appropriately positioned and locked in this manner, the brewing process can commence.

DETAILED DESCRIPTION OF THE INVENTION

The present invention is a brewer apparatus with an improved tray assembly for positioning and securing a pod enclosing a beverage component below the brew head for brewing.

Figure 1:
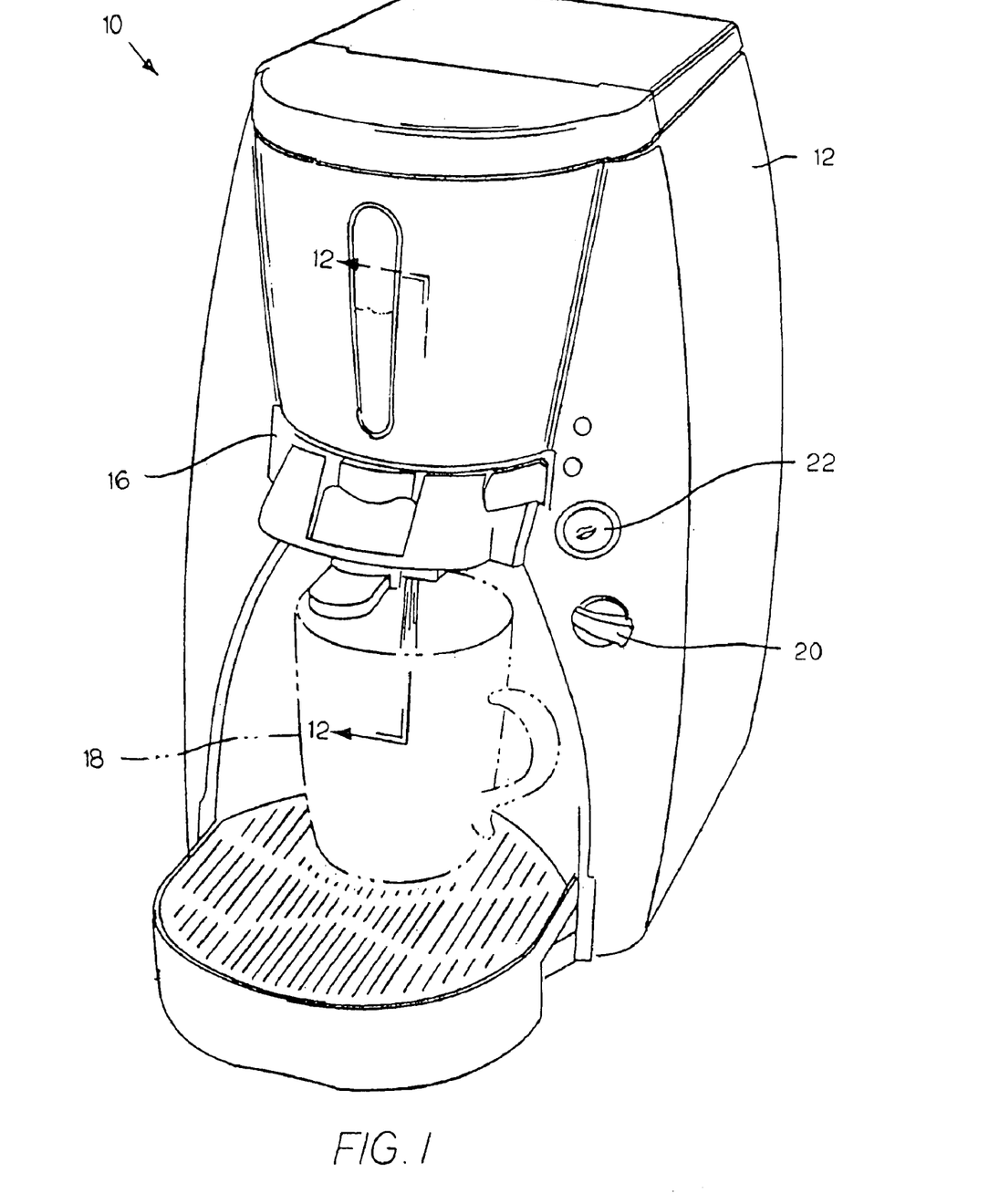
FIG. 1 is a perspective view of an exemplary brewer apparatus made in accordance with the present invention.

FIG. 1 is a perspective view of an exemplary brewer apparatus 10 made in accordance with the present invention. The brewer apparatus 10 includes a housing 12 that houses the internal plumbing and control components of the apparatus 10. Furthermore, the brewer apparatus 10 is designed to use a pod in the brewing process. Such a pod is generally manufactured from two substantially circular sections of filtering paper joined along their respective circumferential edges and enclosing a quantity of ground coffee, tea, or other beverage component. This pod is received and held in a tray assembly 16 and positioned below the brew head of the apparatus 10, such that hot water is directed from the brew head over and through the pod and enclosed beverage component, with the brewed beverage then being dispensed into a cup or similar container 18, as illustrated in FIG. 1.

Figure 2:
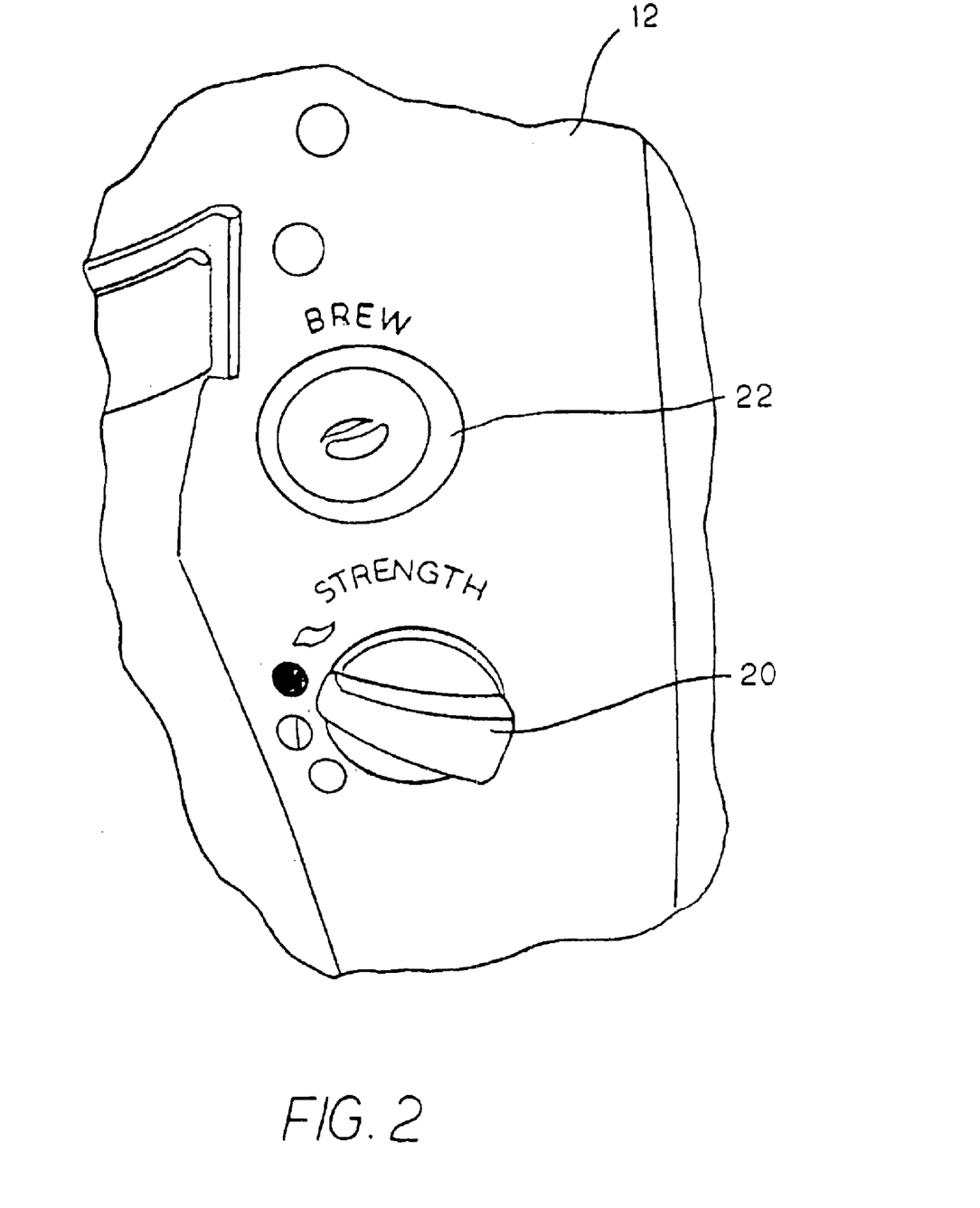
FIG. 2 is an enlarged view of the front surface of the exemplary brewer apparatus of FIG. 1, better illustrating the selection switch and "brew" button.

Furthermore and referring still to FIG. 1, this exemplary brewer apparatus 10 allows a consumer to select a desired strength of the brewed beverage. This selection by the consumer is preferably accomplished using a selector switch 20 on the front surface of the housing 12. Referring now to the enlarged view of FIG. 2, this particular selector switch 20 has three strength settings for a coffee beverage: (1) a light setting; (2) a regular setting; and (3) a strong setting, and further includes a fourth setting for tea. A consumer selects the appropriate setting by rotating the selector switch 20 to the desired position, and then presses the "brew"

button 22 to initiate the brewing process, as is further described below.

Figure 3:
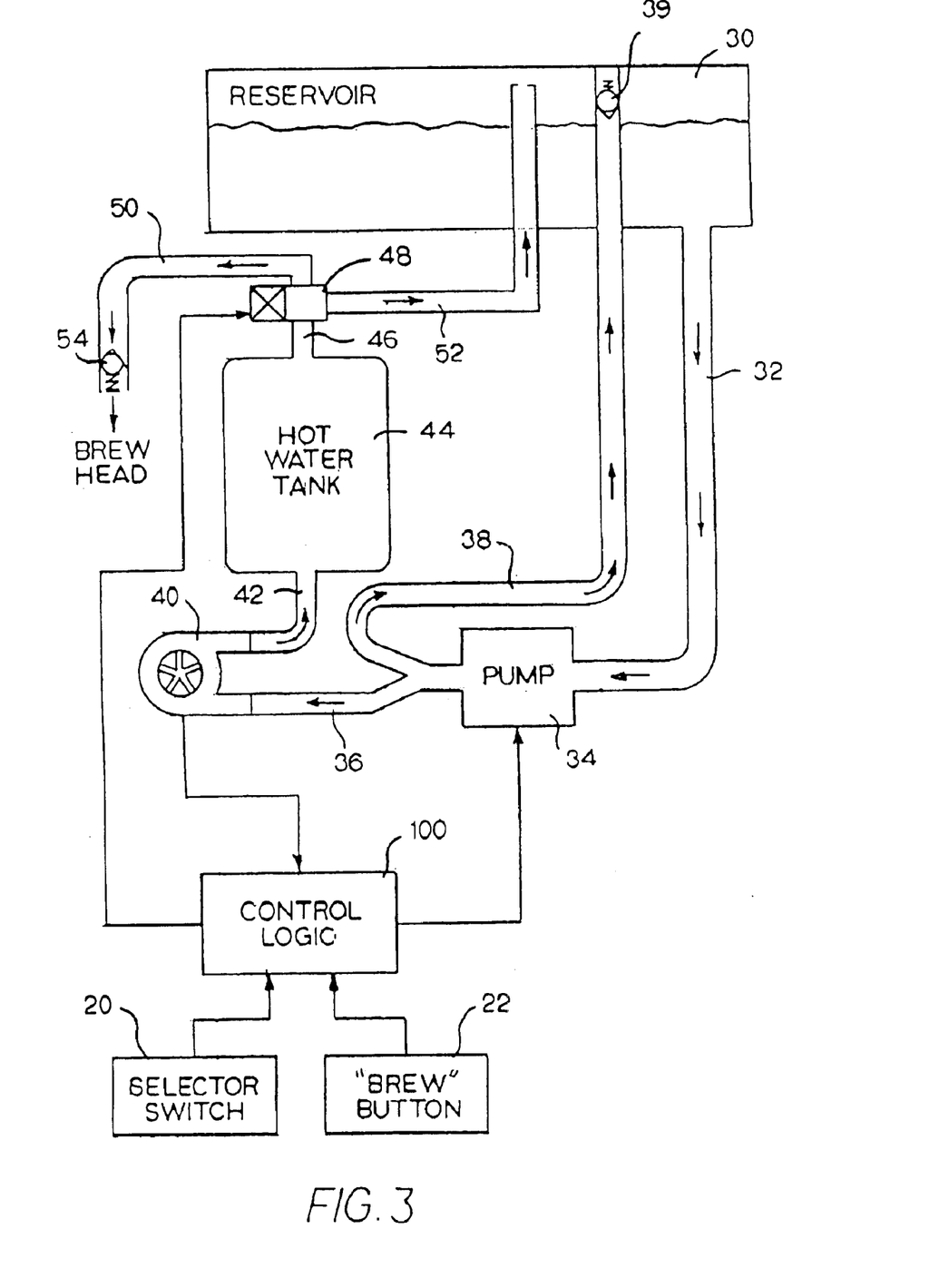
FIG. 3 is a schematic view of the plumbing system of the exemplary brewer apparatus of FIG. 1.
Figure 4:
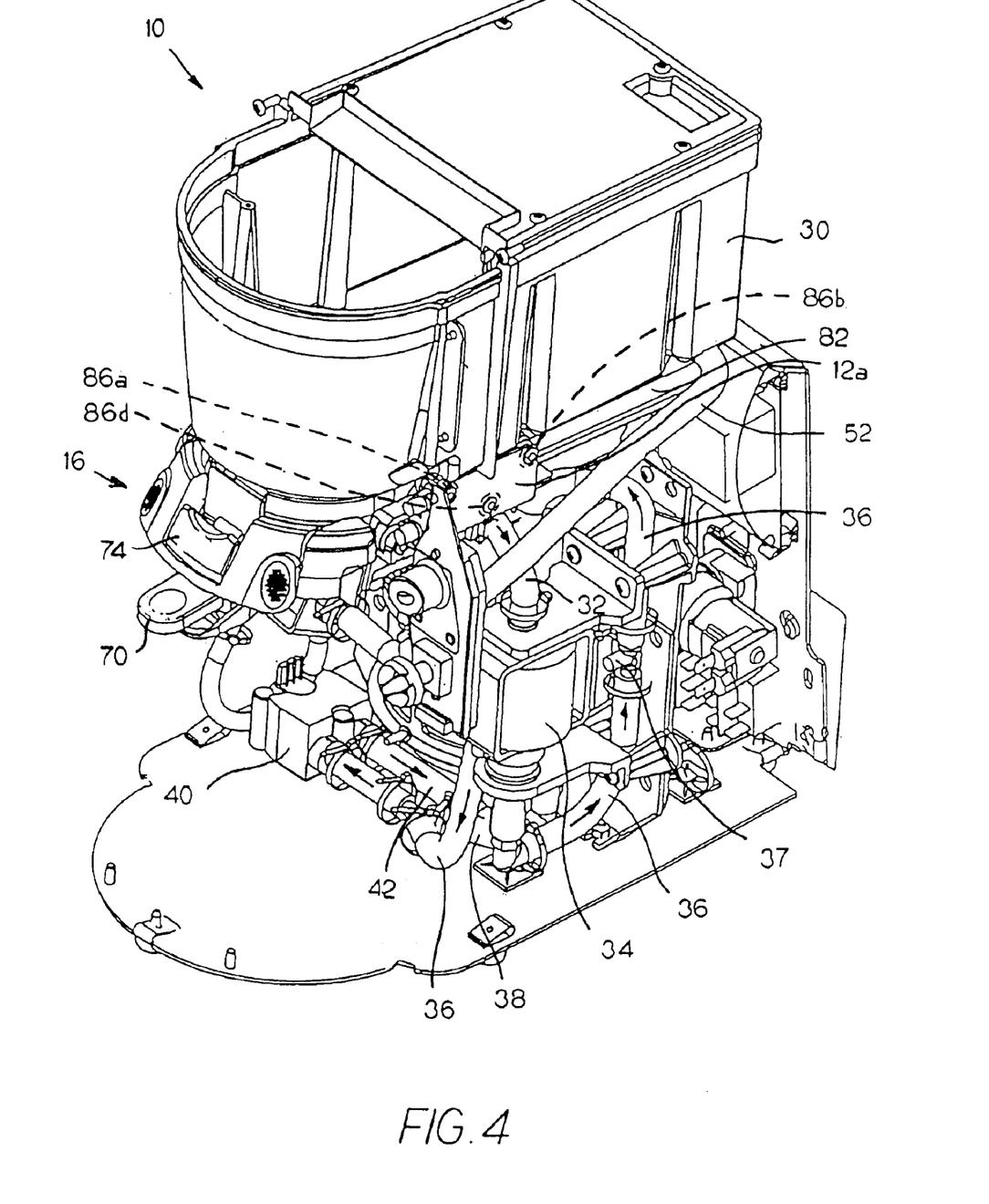
FIG. 4 is a perspective view of the exemplary brewer apparatus of FIG. 1, with the housing removed to show the internal plumbing and control components of the brewer apparatus.
Figure 5:
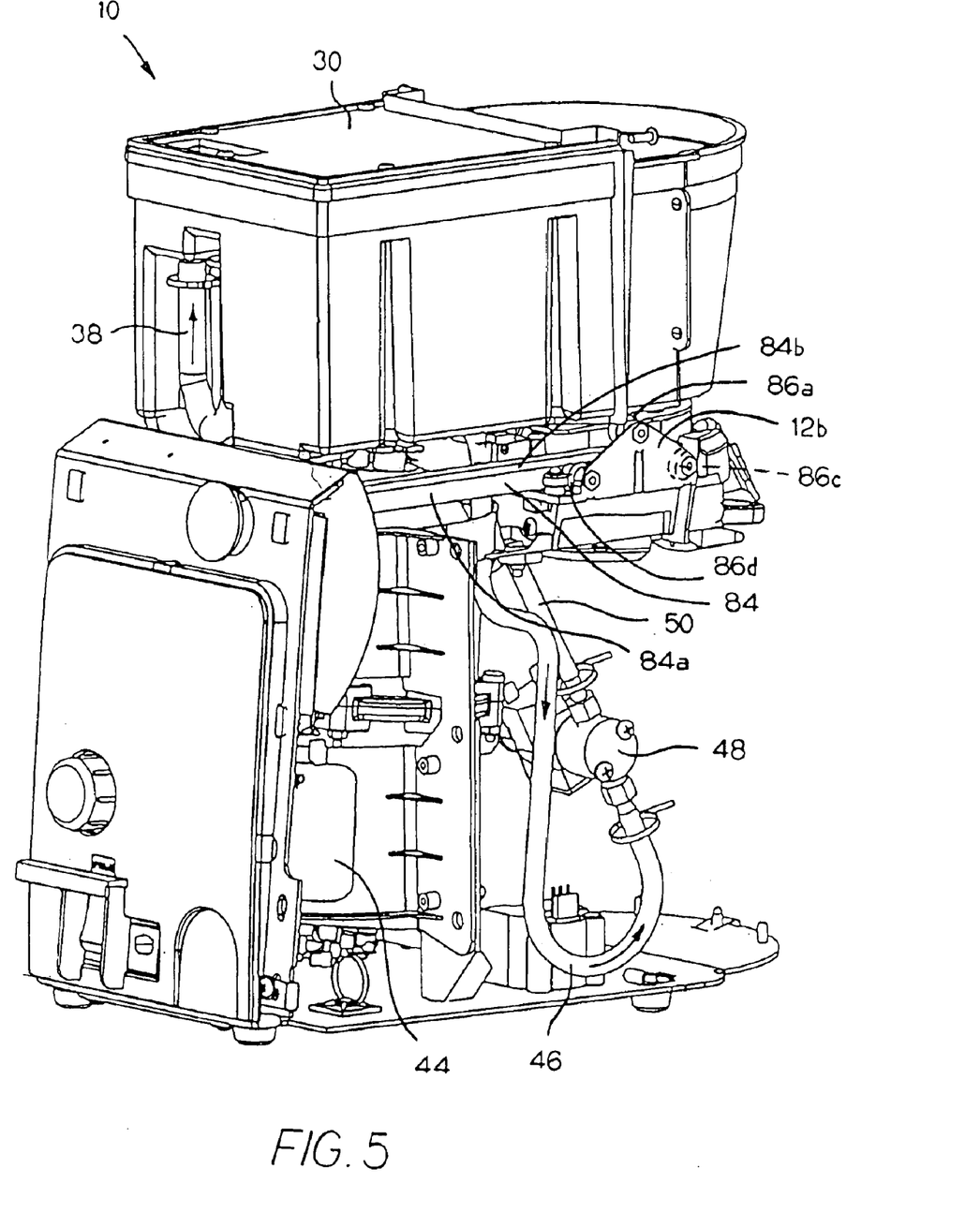
FIG. 5 is another perspective view of the exemplary brewer apparatus of FIG. 1, with the housing removed to show the internal plumbing and control components of the brewer apparatus.

FIG. 3 is a schematic view of the plumbing system for the exemplary brewer apparatus 10 described above with reference to FIGS. 1 and 2, while FIGS. 4 and 5 are perspective views of the exemplary brewer apparatus 10 with the housing 12 removed. Collectively, these Figures allow for a complete understanding of the flow of water through the brewer apparatus 10. As illustrated in these Figures, potable water is stored in and drawn from a water reservoir 30 through a length of tubing 32 via a pump 34. In this regard, although a pump is a preferred means by which to move water through the brewer apparatus 10, it is contemplated that water flow could be induced through gravity or other techniques without departing from the spirit and scope of the present invention. Furthermore, as with all tubing described in the present application, the length of tubing 32 is preferably made of a silicone or similar flexible, food-grade material.

In any event, the pump 34 is activated in response to an action of the consumer, specifically the selection of a beverage strength using the selector switch 20 and depression of the "brew" button 22 on the front surface of the housing 12 of the brewer apparatus 10, as described above with reference to FIG. 2. Furthermore, with respect to the control of the pump 34, as illustrated in the schematic view of FIG. 3, the brewer apparatus 10 includes a control logic 100 that receives signals from the selector switch 20 and the "brew" button 22. Based on these signals and other inputs, the control logic 100 operates the pump 34 and other components of the brewer apparatus 10, as is further described below. Also, it should be recognized and understood that the control logic 100 in this exemplary embodiment is a software code that is resident on a circuit board within the housing 12 of the brewer apparatus 10. Such software coding is readily accomplished by one of ordinary skill in the art.

As the water passes through the pump 34, it is directed to a hot water tank 44, which heats the water to a desired temperature. Specifically, the water exiting the pump 34 is directed through a length of tubing 36 to a flow meter 40. In this exemplary embodiment, the flow meter is a Model FLHC 20 flow meter manufactured and distributed by Digmesa AG of Ipsach, Switzerland. By using a flow meter 40 to measure volumetric flow, a precise, predetermined volume of water can be measured and delivered to the hot water tank 44, which, in turn, causes a precise, predetermined volume of hot water to be forced from the hot water tank 44 and delivered to the brew head, the importance of which is described in further detail below. Also, with respect to the flow meter 40, the measurement data is also communicated to the control logic 100 so that the pump 34 can be de-activated to terminate the water flow through the brewer apparatus 10 at the appropriate time.

With respect to the flow of water from the pump 34 to the flow meter 40, it should also be noted that, in this exemplary embodiment, there is a flow-restricting orifice 37 in the length of tubing 36, as illustrated in FIG. 4, that serves to reduce turbulence and ensure accurate measurement of volumetric flow by the flow meter 40. Furthermore, there is an additional length of tubing 38 which branches off from the length of tubing 36 before the water enters the flow meter 40. This additional length of tubing 38 extends into the water reservoir 30, as illustrated in FIGS. 3 and 5, where it terminates in a check valve 39. This allows for a pressure release should the pressure between the pump 34 and flow meter 40 exceed a predetermined level.

After the water exits the flow meter 40, it passes through another length of tubing 42 into the bottom of the hot water tank 44. As the substantially room-temperature, potable water is introduced into the lower portion of the tank 44, hot water is forced from the upper portion of the tank 44 through yet another length of tubing 46 to a three-way solenoid valve 48 that controls flow to the brew head. In this exemplary embodiment, the three-way solenoid valve is a Model NU243066-1353 valve manufactured and distributed by KIP Inc. of Farmington, Conn.

Figure 12A:
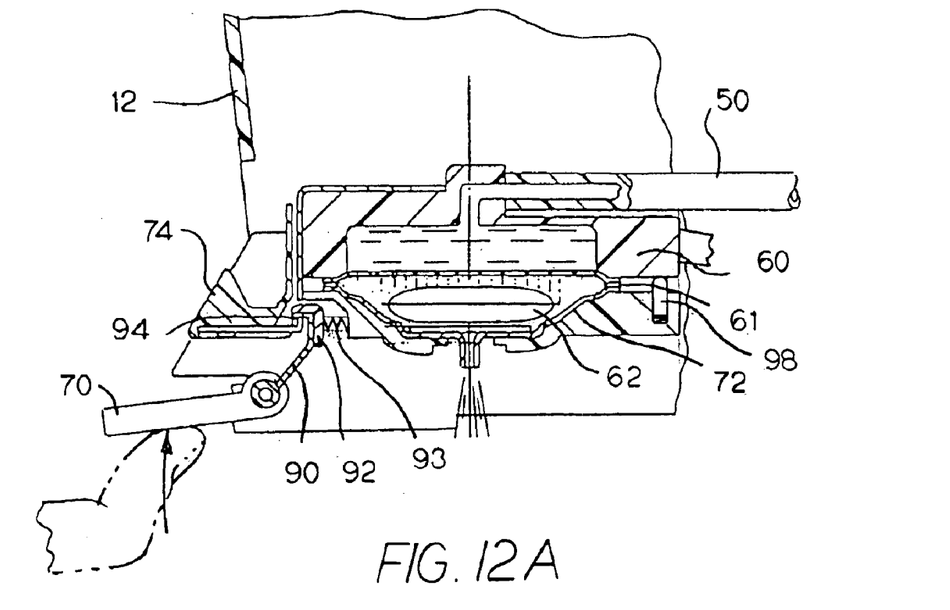
FIG. 12A is a sectional view of the exemplary brewer apparatus of FIG. 1, taken along line 12—12 of FIG. 1, and illustrating the positioning of the pod below the brew head when the brew head is in a closed position.

Assuming the solenoid valve 48 is open, water passes through the solenoid valve 48 into a another length of tubing 50, which delivers the hot water to the brew head. Specifically, as illustrated in the sectional view of FIG. 6, the hot water enters the brew head 60 from the length of tubing 50, and the hot water is then distributed over the pod 62 and enclosed beverage component, with the resultant brewed beverage then being dispensed into a cup or similar container 18 (as illustrated in FIGS. 1 and 12A).

Furthermore, in this exemplary embodiment and as illustrated in FIG. 3, a check valve 54 may be provided near the inlet to the brew head to create a slight back-pressure that minimizes dripping from the tube 50 from the solenoid valve 48 to the brew head 60.

Finally, in this exemplary embodiment, there is another length of tubing 52 extending from the solenoid valve 48 and into the water reservoir 30, such that excess pressure caused by the heating of the water in the tank 44 can be vented to the reservoir 30.

Figure 6:
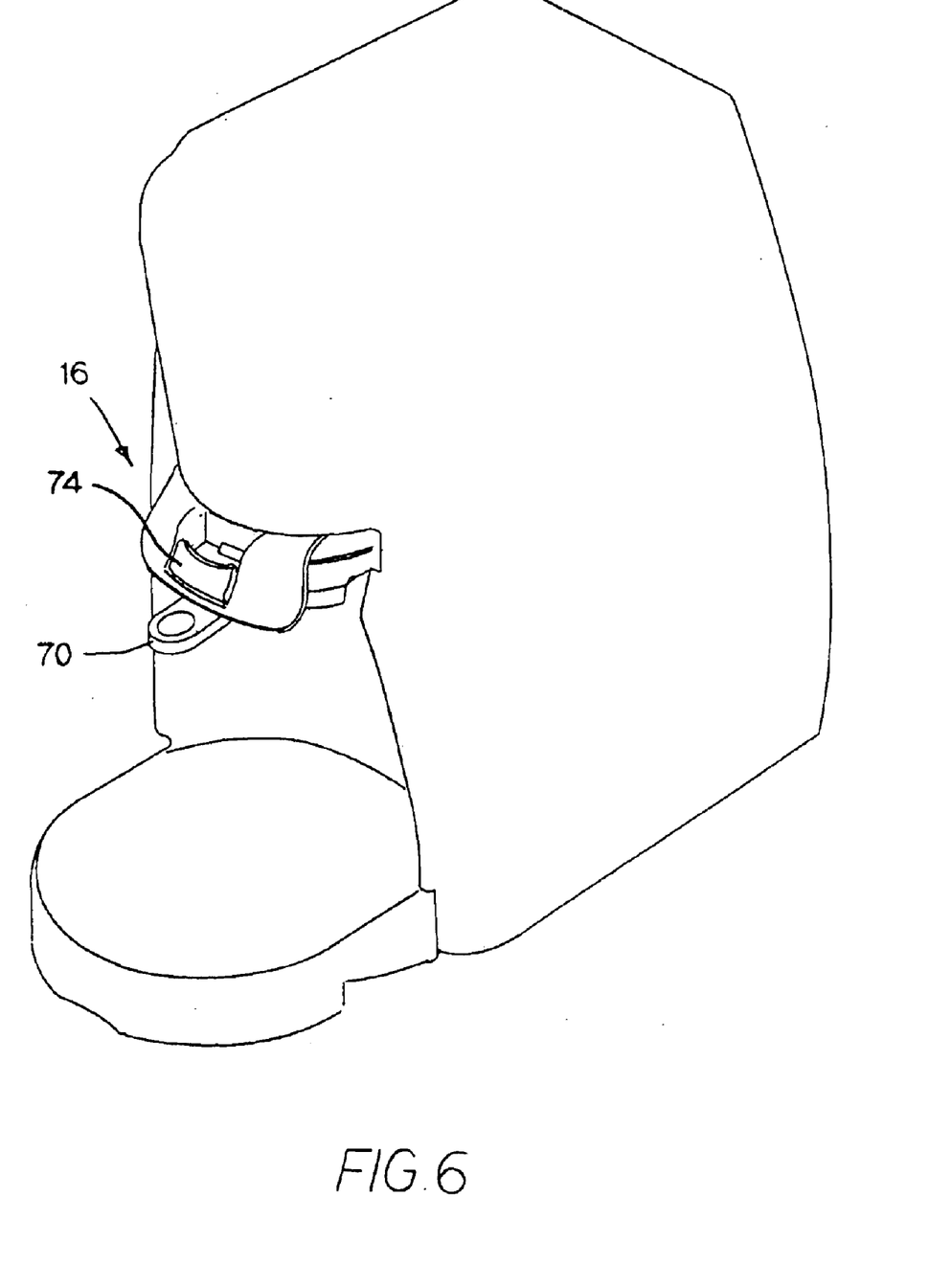
FIGS. 6–8 are perspective views of the tray assembly of the exemplary brewer apparatus of FIG. 1, illustrating the movement of the tray assembly relative to the remainder of the brewer apparatus.

With respect to the opening and closing of the solenoid valve 48, it should be noted that the control logic 100 is also in electrical communication with the solenoid valve 48, such that the solenoid valve 48 can also be closed simultaneously with the de-activation of the pump 34 to terminate the water flow through the brewer apparatus 10 and ensure a precise, predetermined volume of hot water is delivered to the brew head 60 (as illustrated in FIG. 6).

As described above, the brewer apparatus 10 of the present invention is designed to use a pod 62 in the brewing process. This pod 62 is received and held in a tray or similar receptacle 16 and positioned below the brew head 60 of the apparatus 10, such that hot water is directed from the brew head 60 over and through the pod 62 and enclosed beverage component, with the brewed beverage then being dispensed into a cup or similar container 18, as illustrated in FIGS. 1 and 12A. Again, the focus of the present invention is on allowing a consumer to select a desired strength of beverage, and as illustrated in the enlarged view of FIG. 2, the exemplary brewer apparatus 10 thus includes a selector switch 20 having three strength settings for coffee: (1) a light setting; (2) a regular setting; and (3) a strong setting, and a fourth setting for tea. A consumer selects the appropriate setting by rotating the selector switch 20 to the desired position, and then presses the "brew" button 22 to initiate the brewing process.

Referring again to FIG. 3, if the selector switch 20 is rotated to indicate that a light coffee is desired, upon pressing the "brew" button 22, the pump 34 is activated and continues to pump water until a precise, predetermined volume of water has been delivered to the hot water tank 44 (as measured by the flow meter 40), which, in turn, causes a precise, predetermined volume of hot water to be delivered to the brew head 60. Specifically, once the precise, predetermined volume of water has been measured, the control logic 100 de-activates the pump 34 and closes the solenoid valve 48. The predetermined volume of hot water is distributed to and passes over and through the coffee pod 62, and the brewed beverage is dispensed through an outlet and into a cup or similar container 18, as illustrated in FIGS. 1 and 12A.

If the selector switch 20 is rotated to indicate that a regular coffee is desired, upon pressing the "brew" button 22, the control logic 100 activates the pump 34 for a brief time period until a predetermined volume of hot water (for example, 0.50–1.0 fl-oz.) is delivered to moisten the coffee pod 62. The control logic 100 then deactivates the pump 34 for a predetermined time period (for example, 3–5 seconds) to allow for pre-infusion of the coffee grounds to improve extraction and make a stronger coffee. The control logic 100 then re-activates the pump 34, which then continues to pump water until a precise, predetermined volume of water has been delivered to the hot water tank 44 (as measured by the flow meter 40), which, in turn, causes a precise, predetermined volume of hot water to be delivered to the brew head 60. Specifically, once the precise, predetermined volume of water has been measured, the control logic 100 de-activates the pump 34 and closes the solenoid valve 48. Again, this predetermined volume of hot water is distributed to and passes over and through the coffee pod 62, and the brewed beverage is dispensed through an outlet and into a cup or similar container 18, as illustrated in FIGS. 1 and 12A.

If the selector switch 20 is rotated to indicate that a strong coffee is desired, upon pressing the "brew" button 22, the control logic 100 activates the pump 34 for a brief period until a predetermined volume of hot water (for example, 0.50–1.0 fl-oz.) is delivered to the coffee pod 62, and then de-activates the pump 34 for a predetermined time period (for example, 3–5 seconds), with such an on-off or "pulsing cycle" of water delivery followed by a timed delay continuing until a precise, predetermined volume of water has been delivered to the hot water tank 44 (as measured by the flow meter 40), which, in turn, causes a precise, predetermined volume of hot water to be delivered to the brew head 60. Specifically, once the precise, predetermined volume of water has been measured, the control logic 100 de-activates the pump 34 and closes the solenoid valve 48.

Finally, if the selector switch 20 is provided with an option to brew tea (as in this exemplary embodiment) and is rotated to this option, similar to the strong coffee option, the pump 34 is activated and pulses to pump water until a precise, predetermined volume of water has been delivered to the hot water tank 44, at which time the control logic 100 de-activates the pump 34 and closes the solenoid valve 48

Regardless of which option is chosen, a constant predetermined volume of brewed beverage is dispensed. In other words, the strength of the brewed beverage is not altered by merely adding or subtracting water, but rather by increasing or decreasing the total dissolved solids in the brewed beverage.

Figure 7:
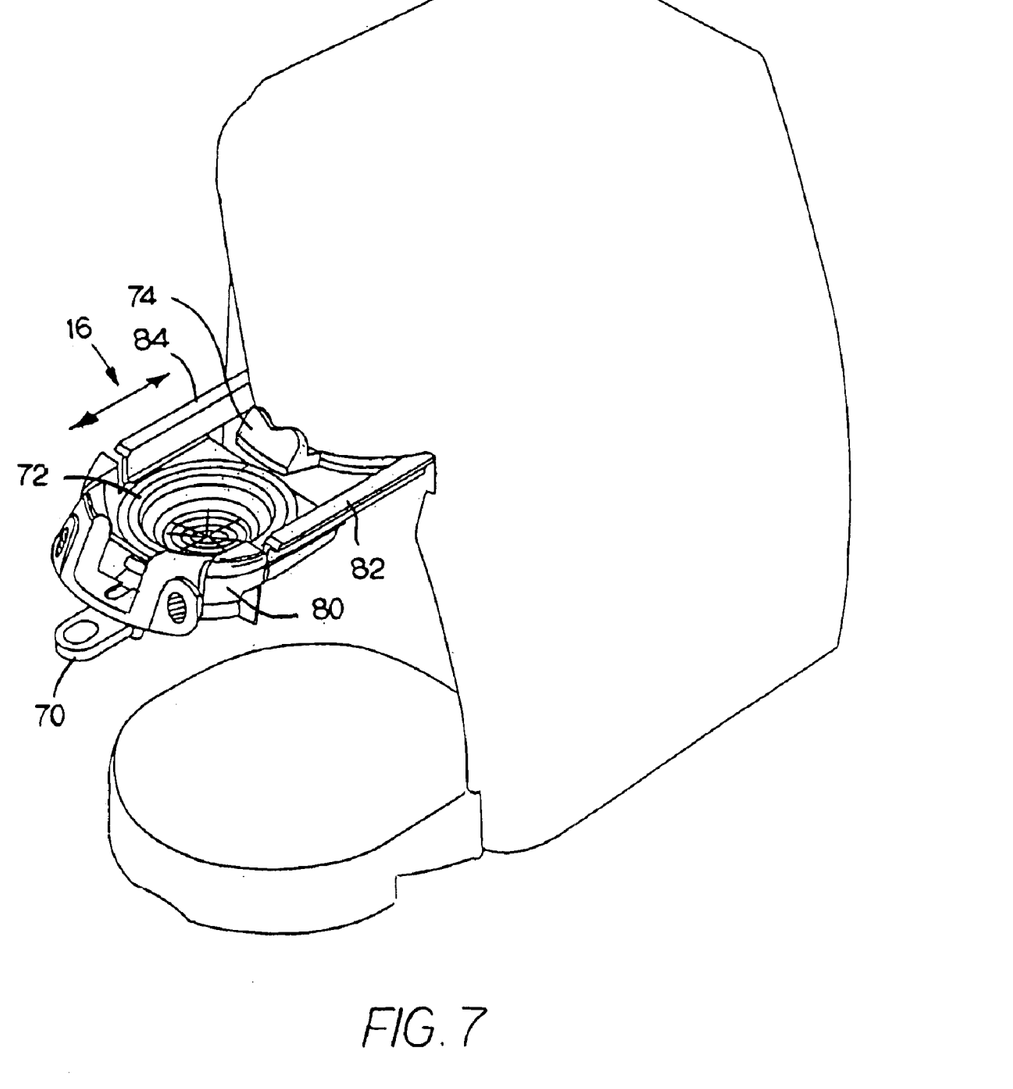
Figure 8:
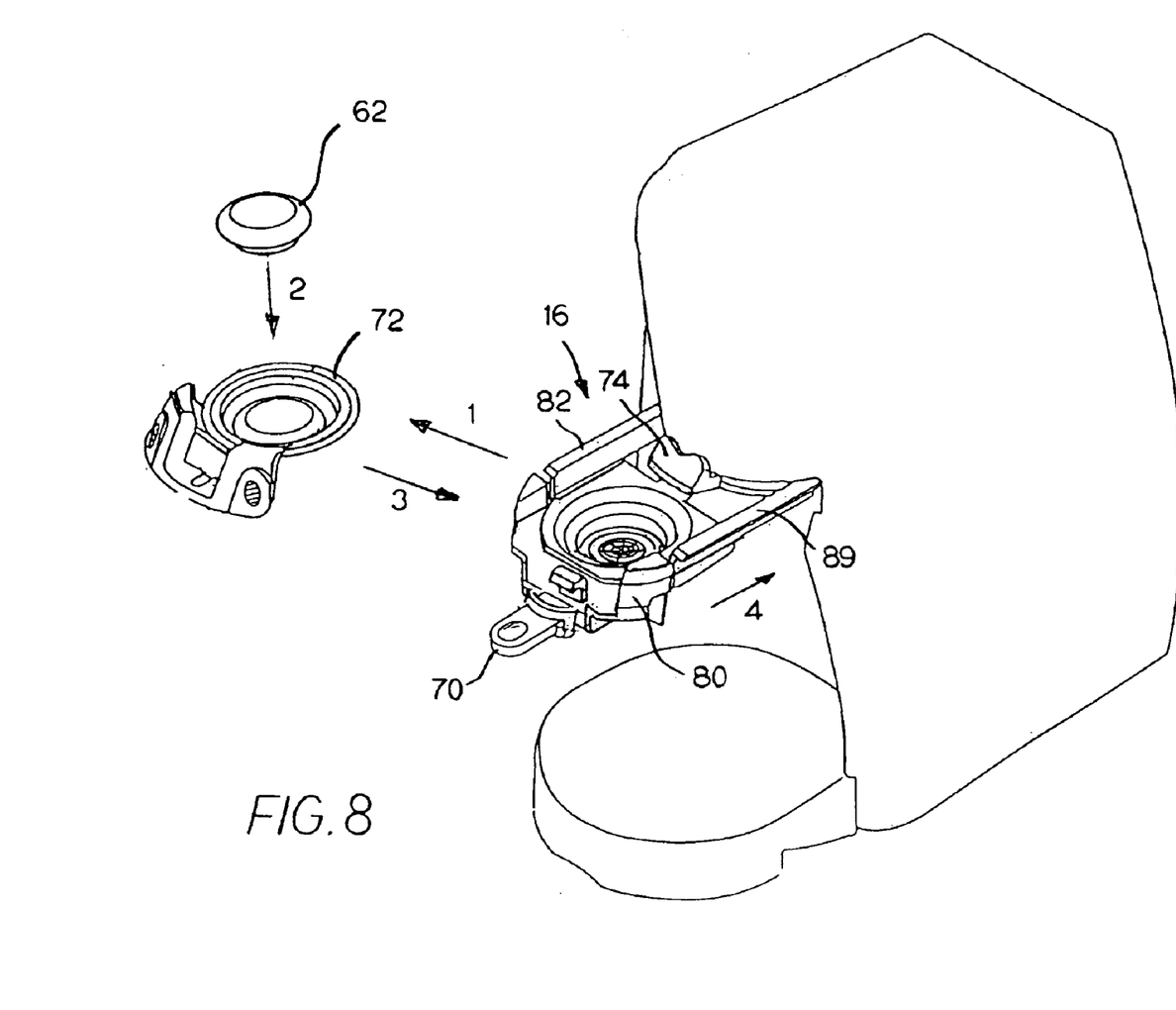

In any event, and as mentioned above, the focus of the present invention is on the tray assembly 16 that positions and secures the coffee pod 62 below the brew head 60 for brewing. FIGS. 6–8 are perspective views of the tray assembly 16 of the exemplary brewer apparatus 10, illustrating the movement of the tray assembly 16 relative to the housing 12 and remainder of the brewer apparatus 10 to unload and/or load a pod 62. Generally, to unload and/or load the tray assembly 16, a user first must disengage the tray assembly 16 from its position relative to the brew head 60. This disengagement may be effectuated by lifting a release latch 70 that extends outwardly from the tray assembly 16, and the brew head 60 can then be pivoted upwardly and away from the tray assembly 16, as will be further described below. The tray assembly 16 can then be pulled and moved away from the housing 12 and remainder of the brewer apparatus 10, allowing access to a pod holder 72, which is received and retained in the tray assembly 16, as illustrated in FIGS. 7 and 8. The pod holder 72 is then removed from the tray assembly 16, and a pod 62 can be removed from or placed into the pod holder 72. Of course, the pod 62 may also be removed from or placed into the pod holder 72 without removing the pod holder 72 from the tray assembly 16. Finally, the tray assembly 16 is pushed and advanced back into position relative to the brew head 60, and, by pushing down on a button 74 extending from the brew head 60, the brew head 60 is pivoted into a closed position, and the tray assembly 16 is effectively locked into position relative to the brew head 60. Once the pod 62 has been appropriately positioned and locked in this manner, the brewing process can commence.

Figure 9:
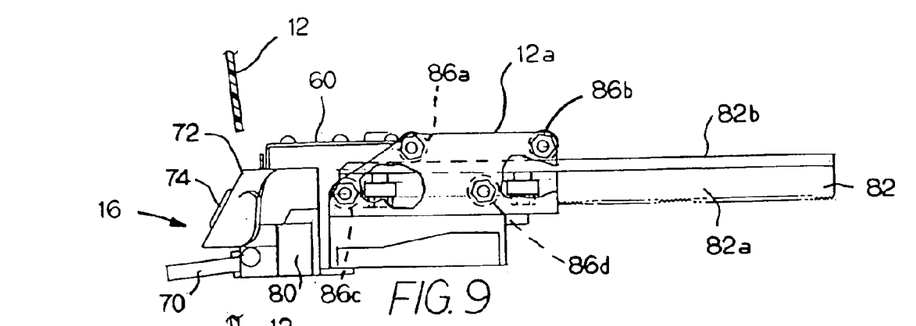
FIGS. 9–11 are side views of the tray assembly of the exemplary brewer apparatus of FIG. 1, again illustrating the movement of the tray assembly relative to the remainder of the brewer apparatus.
Figure 10:
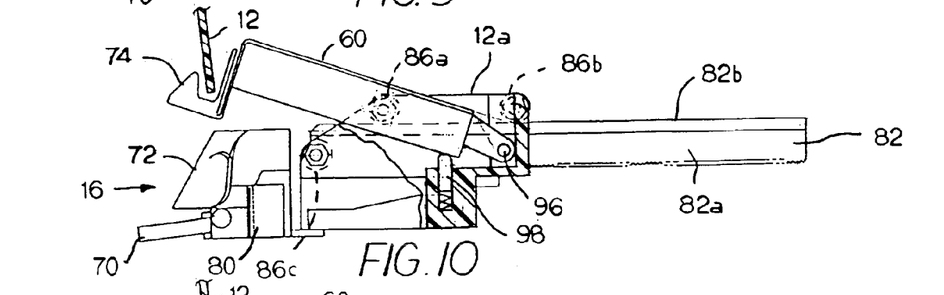
Figure 11:
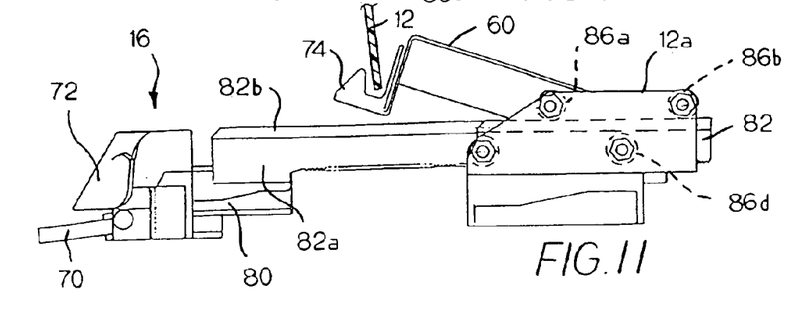

For further explanation of this movement of the tray assembly 16 relative to the housing 12 and remainder of the brewer apparatus 10, reference is made to the side views of FIGS. 9–11. As illustrated in these Figures, the tray assembly 16 includes a front portion 80 that supports the pod holder 72. It further includes two rearwardly extending rails 82, 84. Although only one rail 82 is visible in the side views of FIGS. 9–11, the other rail 84 can be seen in the perspective view of FIG. 5. Each rail 82, 84 is an elongated member having a substantially vertical web portion 82a, 84a and a substantially horizontal upper flange portion 82b, 84b, such that each rail 82, 84 has a substantially L-shaped cross-section.

Referring still to FIGS. 9–11, the brewer apparatus 10 includes two interior wall portions 12a, 12b, one on each side of the tray assembly 16. Although only one wall portion 12a is visible in the side views of FIGS. 9–11, these two wall portions 12a, 12b can be seen in the perspective views of FIGS. 4 and 5. Guide wheels are rotatably mounted to these wall portions 12a, 12b. In this exemplary embodiment, and as best illustrated in FIGS. 9–11, there are four guide wheels 86a, 86b, 86c, 86d mounted to the first wall portion 12a, each of which rotates about a substantially horizontal axis. Referring again to FIG. 5, there are three similar guide wheels 88a, 88c, 88d mounted to the second wall portion 12b, each of which also rotates about a substantially horizontal axis. These guide wheels 86a, 86b, 86c, 86d, 88a, 88c, 88d are designed to engage the respective rails 82, 84. With respect to the first rail 82 and as illustrated in FIGS. 9–11, two guide wheels 86a, 86b engage the upper surface of the flange portion 82b of the rail 82, and the other two guide wheels 86c, 86d engage the lower surface of the flange portion 82b. Similarly, with respect to the second rail 84 and as illustrated in FIG. 5, one guide wheel 88a engages the upper surface of the flange portion 84b of the rail 84, and the other two guide wheels 88c, 88d engage the lower surface of the flange portion 84b.

Furthermore, referring specifically to FIG. 9, in this exemplary embodiment, there is a pair of guide wheels 90, 92 provided that rotate about a substantially vertical axis which engage the substantially vertical web portion 82a of the rail 82. And, although not illustrated in the side views of FIG. 9–11, a substantially identical pair of guide wheels engages the substantially vertical web portion 84a of the other rail 84 on the other side of the tray assembly 16.

Accordingly, the rails 82, 84 ride on the respective guide wheels, which allows the tray assembly 16 to be pulled away from or advanced toward the housing 12 and remainder of the brewer apparatus 10 to allow access to the pod holder 72. In this regard, FIG. 9 illustrates the tray assembly 16 in a first position, where it is received within the housing 12 of the brewer apparatus 10, with the brew head 60 in a closed position such that it is sealed against the tray assembly 16 for brewing. FIG. 10 illustrates the tray assembly 16 as the brew head 60 is pivoted upwardly and away from the tray assembly 16 to an open position. Finally, FIG. 11 illustrates the tray assembly 16 in a second position where it has been pulled away from the housing 12 and remainder of the brewer apparatus 10 to allow access to the pod holder 72.

Figure 12B:
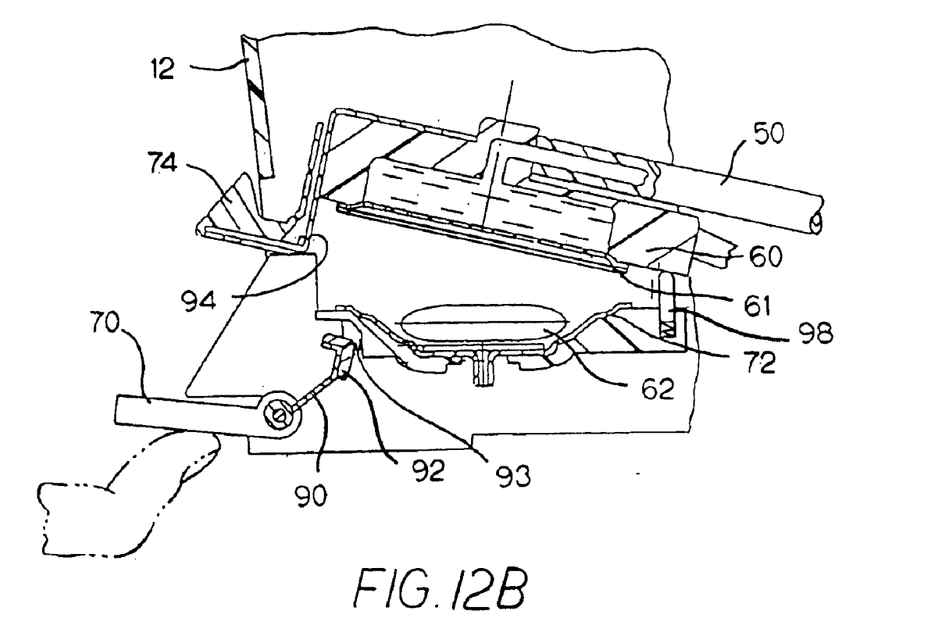
FIG. 12B is a sectional view of the exemplary brewer apparatus similar to that of FIG. 12A, but illustrating the brew head in an open position.

Finally, to understand how the tray assembly 16 is secured and "locked" relative to the brew head 60, reference is made to the sectional views of FIGS. 12A and 12B. Specifically, FIG. 12A is a sectional view of the exemplary brewer apparatus 10 of FIG. 1 taken along line 12—12 of FIG. 1 and illustrating the positioning of the pod 62 below the brew head 60 with the tray assembly 16 in the closed position, and FIG. 12B is a similar sectional view, where the brew head 60 has been pivoted away from the tray assembly 16 to the open position.

As illustrated in FIGS. 12A and 12B, the release latch 70 (as described above with reference to FIGS. 6–8) is pivotally secured to the housing 12 at one distal end thereof such that an upward pressure applied to the opposite end of the release latch 70 causes it to rotate about a substantially horizontal axis of rotation. Extending from the release latch 70 is an upwardly extending arm 90 that terminates in an L-shaped locking member 92. The button 74 that is secured to and extends from the brew head 60 includes a rear lip portion 94. In the closed position illustrated in FIG. 12A, the locking member 92 of the release latch 70 engages this lip portion 94 of the button 74, thus securing and locking the brew head 60 into position.

When an upward pressure is applied to the release latch 70, as illustrated in FIG. 12A, the release latch 70 rotates clockwise about its axis of rotation. This action rotates the arm 90 and locking member 92 away from the lip portion 94 of the button 74, thereby releasing the brew head 60 and allowing it to be pivoted upwardly and away from the tray assembly 16 to the open position, as illustrated in FIG. 12B. Specifically, and as best illustrated in FIG. 10, the brew head 60 is pivotally secured to the housing 12 along a rear edge thereof, such that it can pivot relative to the housing 12 about a substantially horizontal axis 96. Furthermore, in this exemplary embodiment and referring still to FIG. 10, the brew head 60 is biased into this open position by a plurality of spring-loaded plungers 98 arrayed near the rear edge of the brew head 60, which provide an upward biasing force. Thus, when the brew head 60 is released, the spring-loaded plungers 98 cause the brew head 60 to pivot upwardly and away from the tray assembly 16. Then, as described above with referenced to FIGS. 6–8 and 9–11, the tray assembly 16 can be pulled and moved away from the remainder of the brewer apparatus 10, allowing access to the pod holder 72.

Finally, once the tray assembly 16 is pushed and advanced back into the first position relative to the brew head 60, it can be again locked by pushing down on the button 74, so that the lip portion 94 of the button re-engages the locking member 92 of the release latch 70. In this regard, it should be noted that this exemplary brewer apparatus 10 includes a circumferential seal 61 secured to the brew head 60 that serves to seal the brewing chamber formed between the brew head 60 and the pod holder 72 when the brew head 60 is in the closed position with the tray assembly 16 essentially locked relative to the remainder of the brewer apparatus 10. Furthermore, in this exemplary embodiment, it should be noted that the release latch 70 is preferably biased such that, when a user ceases to apply an upward pressure to the release latch 70, it returns to the locked position. As illustrated in FIGS. 12A and 12B, in this exemplary embodiment, such biasing is accomplished by a spring 93.

It will be obvious to those skilled in the art that other modifications may also be made to the exemplary embodiment described herein without departing from the spirit and scope of the present invention.

What is claimed:

1. A brewer apparatus, comprising:
    a plumbing system for delivering water to a brew head;
    a control logic for controlling operation of said plumbing system;
    a housing enclosing the plumbing system and control logic, said brew head being pivotally connected to said housing for rotation about a substantially horizontal axis; and
    a tray assembly for receiving and positioning a quantity of a beverage component below the brew head,
    wherein the tray assembly is adapted for selective movement between a first position where it is positioned below the brew head, and a second position where it extends away from the housing of the brewer apparatus, thus allowing access to the quantity of beverage component, and
    wherein said brew head can be pivoted between a closed position where it is sealed against the tray assembly for brewing and an open position where it is pivoted upwardly and away from said tray assembly to allow for the selective movement of said tray assembly between said first position and said second position.

2. The brewer apparatus as recited in claim 1, wherein said brew head is biased into the open position.

3. The brewer apparatus as recited in claim 2, wherein the biasing of said brew head to the open position is accomplished by one or more spring-loaded plungers.

4. The brewer apparatus as recited in claim 2, wherein the brew head can be pivoted and locked into said closed position where it is sealed against the tray assembly through depression of a button extending from the brew head.

5. The brewer apparatus as recited in claim 4, wherein the brew head can be disengaged from said closed position by selective movement of a release latch, which then allows for movement of said tray assembly from said first position to said second position.

6. The brewer apparatus as recited in claim 5, wherein said release latch includes an arm that terminates in a locking member, said locking member engaging the button when the brew head is locked into the closed position, movement of said release latch causing said locking member to rotate away from and disengage the button, allowing the brew head to return to the open position.

7. The brewer apparatus as recited in claim 6, wherein the locking member of said release latch is biased into engagement with the button by a spring.

8. The brewer apparatus as recited in claim 1, wherein said tray assembly receives a pod holder, which in turn, receives a pod enclosing the beverage component.

9. A brewer apparatus, comprising:
    a plumbing system for delivering water to a brew head;
    a control logic for controlling operation of said plumbing system;
    a housing enclosing the plumbing system and control logic; and
    a tray assembly for receiving and positioning a quantity of a beverage component below the brew head, wherein the tray assembly is adapted for selective movement between a first position where it is positioned below the brew head, and a second position where it extends away from the housing of the brewer apparatus, thus allowing access to the quantity of beverage component, and wherein the tray assembly can be locked into said first position below the brew head through depression of a button extending from the brew head, which causes the brew head to be sealed against the tray assembly.

10. The brewer apparatus as recited in claim 9, wherein the tray assembly can be disengaged from said first position below the brew head for movement to said second position by selective movement of a release latch.

11. The brewer apparatus as recited in claim 10, wherein said release latch includes an arm that terminates in a locking member, said locking member engaging the button when the tray assembly is locked into said first position below the brew head, movement of said release latch causing said locking member to rotate away from and disengage the button, thus allowing for movement of the tray assembly to said second position.

12. The brewer apparatus as recited in claim 11, wherein once the tray assembly is returned to said first position, depression of said button causes the locking member of said release latch to re-engage the button, locking the tray assembly into said first position below the brew head.

13. The brewer apparatus as recited in claim 12, wherein the locking member of said release latch is biased into engagement with the button by a spring.

14. The brewer apparatus as recited in claim 9, wherein said tray assembly includes a front portion for receiving and retaining the quantity of beverage component and two rearwardly extending rails, said rails riding on guide wheels, facilitating the selective movement of said tray assembly between said first and second positions.

15. The brewer apparatus as recited in claim 14, wherein each rail is an elongated member having a substantially vertical web portion and a substantially horizontal upper flange portion.

16. The brewer apparatus as recited in claim 15, wherein one or more of the guide wheels engage the substantially horizontal upper flange portion of each rail.

17. The brewer apparatus as recited in claim 16, wherein one or more of the guide wheels engage the substantially vertical web portion of each rail.

18. The brewer apparatus as recited in claim 14, wherein the front portion of said tray assembly receives a pod holder, which in turn, receives a pod enclosing the beverage component.

* * * * *